(12) United States Patent
Abou-Assali et al.

(10) Patent No.: US 9,237,595 B2
(45) Date of Patent: Jan. 12, 2016

(54) DIAMETER BASED COMMUNICATION SESSION DISCOVERY AND RECOVERY

(71) Applicant: ORACLE INTERNATIONAL CORPORATION, Redwood Shores, CA (US)

(72) Inventors: Tarek Abou-Assali, Wellesley, MA (US); Uri Baniel, Buffalo Grove, IL (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 101 days.

(21) Appl. No.: 14/185,218

(22) Filed: Feb. 20, 2014

(65) Prior Publication Data

US 2015/0237669 A1  Aug. 20, 2015

(51) Int. Cl.
  H04L 1/00  (2006.01)
  H04W 76/02  (2009.01)
  H04L 29/06  (2006.01)
  H04M 15/00  (2006.01)

(52) U.S. Cl.
  CPC ......... *H04W 76/028* (2013.01); *H04L 63/0892* (2013.01); *H04M 15/66* (2013.01)

(58) Field of Classification Search
  CPC ... H04L 12/1407; H04L 43/028; H04L 47/20; H04L 63/20; H04W 8/26
  USPC .......................................... 370/216, 252, 328
  See application file for complete search history.

(56) References Cited

U.S. PATENT DOCUMENTS

| | | | |
|---|---|---|---|
| 8,566,474 B2 | 10/2013 | Kanode et al. | |
| 2006/0036741 A1* | 2/2006 | Kiss | H04L 29/06027 709/227 |
| 2010/0121960 A1 | 5/2010 | Baniel et al. | |
| 2011/0165901 A1 | 7/2011 | Baniel et al. | |
| 2011/0225280 A1 | 9/2011 | Delsesto et al. | |
| 2012/0087262 A1* | 4/2012 | Rasanen et al. | 370/252 |
| 2012/0110641 A1* | 5/2012 | Parker et al. | 726/4 |
| 2012/0282955 A1 | 11/2012 | Abou-Assali et al. | |
| 2013/0021933 A1 | 1/2013 | Kovvali et al. | |

OTHER PUBLICATIONS

P. Calhoun et al.; "Diameter Base Protocol"; Network Working Group; Request for Comments 3588; Category Standards Tracks; www.ietf.org/rfc/rfc3588.txt; Nov. 5, 2013.
www.ibm.com;developerworkds/wireless/library/wi-diameter/; "Introduction to Diameter"; Jan. 24, 2006.

* cited by examiner

*Primary Examiner* — Dady Chery
(74) *Attorney, Agent, or Firm* — Miles & Stockbridge, P.C.

(57) ABSTRACT

A Diameter based network that includes nodes and accommodates Diameter communication sessions between nodes establishes a first Diameter communication session between a first node and a second node, and at some point determines that the first Diameter communication session is lost. The first node generates a query using a second Diameter communication session that is a different session than the first Diameter communication session. The first node transmits the query to the second node, where the query includes a session type and key identifiers for the first Diameter communication session. The second node re-establishes the first Diameter communication session with the first node and transmits, in response to the query, an indication that the first Diameter communication session exists.

20 Claims, 4 Drawing Sheets

DIAMETER BASED COMMUNICATION SESSION DISCOVERY AND RECOVERY

FIELD

One embodiment is directed generally to a communication session, and in particular to a Diameter based communication session.

BACKGROUND INFORMATION

"Diameter" is an authentication, authorization, and accounting protocol ("AAA") for computer networks. The Diameter base protocol is defined by RFC 6733 and defines the minimum requirements for an AAA. The Diameter base protocol is intended to provide an AAA framework for applications such as network access or Internet Protocol ("IP") mobility in both local and roaming situations.

Diameter applications can extend the base protocol by adding new commands, attributes, or both. A Diameter application is not a software application but is a protocol based on the Diameter base protocol. Each application is defined by an application identifier and can add new command codes and/or new mandatory attribute-value pairs ("AVP"s). Examples of Diameter applications include various applications in the 3rd Generation Partnership Project ("3GPP") mobile telecommunication standards.

One example of a Diameter application, the 3GPP "Gx" application, which is used between the Policy and Charging Rule Function ("PCRF") and the Policy and Charging Enforcement Function ("PCEF"), is based on the Diameter standard and is primarily used to perform monitoring, authorization, Quality of service ("QoS") and charging control of users' traffic (e.g., Long Term Evolution ("LTE") traffic) in accordance with the operator's policies.

Another example of a Diameter application is the "Rx" application, which is used between the Application Function ("AF") and the Policy and Charging Rule Function ("PCRF"). It is used to monitor, authorize and control application related traffic (e.g., IP Multimedia Subsystem ("IMS") related traffic of users). The AF interacts with the PCRF over Rx by providing service related information. The PCRF, upon receipt of service information from the AF over Rx, provisions corresponding policy and charging rules on the PCEF via Gx to control the data flows signaled over Rx.

SUMMARY

One embodiment is a Diameter based network that includes nodes and accommodates Diameter communication sessions between nodes. The network establishes a first Diameter communication session between a first node and a second node, and at some point determines that the first Diameter communication session is lost. The first node generates a query using a second Diameter communication session that is a different session than the first Diameter communication session. The first node transmits the query to the second node, where the query includes a session type and key identifiers for the first Diameter communication session. The second node re-establishes the first Diameter communication session with the first node and transmits, in response to the query, an indication that the first Diameter communication session exists.

DETAILED DESCRIPTION

One embodiment is a system that allows a node for a Diameter based session between two nodes to query the other node to obtain information about the session. If the session is lost, the node uses a new Diameter application that is independent of the Diameter application associated with the lost session. The information can be used to reestablish the session between the nodes if one node loses its state during the session, or it can be used for auditing or statistical purposes.

As discussed, a Diameter based session may exist between two nodes, such as "Node A" and "Node B". For example, in a 3GPP network, a Diameter "Gx" session may exist between the Policy and Charging Enforcement Function ("PCEF") and the Policy and Charging Rule Function ("PCRF"). The PCEF is typically hosted on the anchor IP router in a 3GPP network and can enforce network operator policies. These policies are controlled/managed by the PCRF. The PCRF can dynamically install operator policies into the PCEF over a Gx interface. An example of a policy may be a boost of throughput and a minimization of delay for a real time traffic of a specific tier/group of users. The policies enable the network operator to achieve a better control of the 3GPP network, primarily in the areas of charging, Quality of service ("QoS") and application detection.

Gx is a reference point between a PCEF and a PCRF. The Diameter Gx application is used over this reference point for provisioning and removal of Policy Control & Charging ("PCC") rules from the PCRF to the PCEF and the transmission of traffic plane events from the PCEF to the PCRF.

Further, a Diameter "Rx" session may exist between an Application Function ("AF") and the PCRF. An AF is an element offering application that uses IP bearer resources (e.g., a Call Session Control Function or "P-CSCF"). The Diameter Rx application is used over the Rx reference point between the AF and the PCRF and is used to exchange application level session information between the AF and the PCRF.

A Diameter session may get lost in one of the nodes. When a node loses a session, it by definition loses the key of the session (i.e., the "Session-Id"). Therefore, the node does not have an in-session way to "discover" the lost session and trigger a recovery action. Known approaches attempt to terminate or delete a session if one of the nodes has lost context of a session.

In contrast, embodiments of the invention implement an "out-of-band" Diameter based approach for one of the nodes to query the other node in order to: (1) discover if the other node may still have the session; and (2) if the node still has the session, trigger it to recover the session with the node that lost the session.

Figure 1:
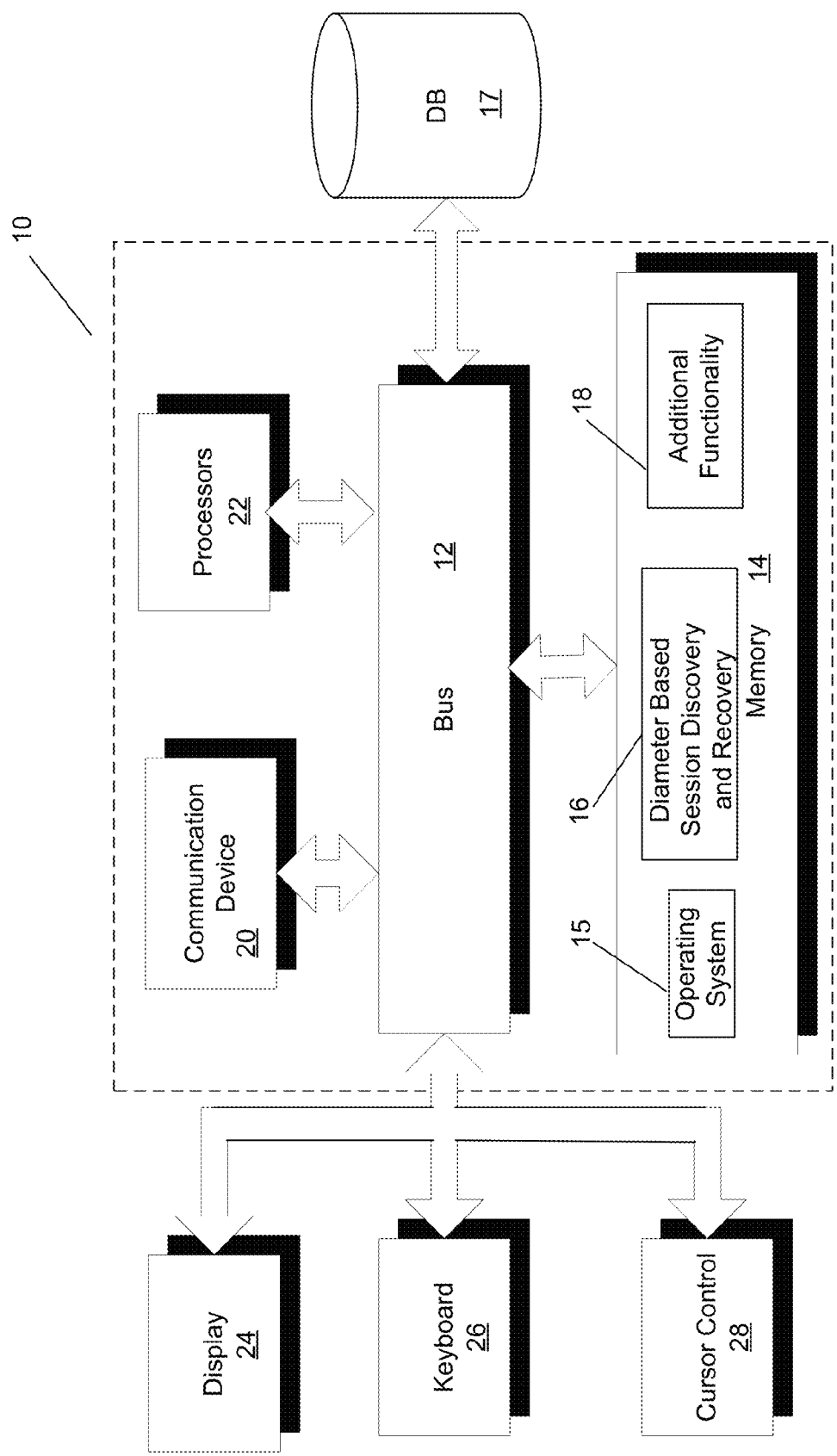
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a user client, system 10 may be a smartphone that includes a processor, memory and a display, but may not include one or more of the other components shown in FIG. 1. Any individual element discussed herein, such as a node, server, client, router, etc., may be implemented using one or more components of system 10.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a Diameter based session discovery and recovery module 16 for performing session discovery and recovery, and all other functionality disclosed herein. System 10 can be part of a larger system, such as a "Diameter Signaling Router" from Oracle Corp. or a Multimedia Policy Engine. Therefore, system 10 can include one or more additional functional modules 18 to include the additional functionality. A database 17 is coupled to bus 12 to provide centralized storage for modules 16 and 18.

In one embodiment, when a node needs to discover a "lost" session and trigger a recovery action, the node uses a new Diameter application that is independent of the application associated with the lost session. This Diameter recovery application is stateless and has a single message/command, as described below. Embodiments can be used with any Diameter based application which is used for establishing, updating and terminating user related sessions. Embodiments can be used with any two Diameter nodes in an IP network which share at least one active Diameter session (i.e., one of the nodes is the client of the session, and the other node is the server of the session).

Embodiments allow a Diameter node to discover lost sessions by using an "out of band" mechanism. Embodiments further allow a Diameter node to trigger a recovery action on another Diameter node by using an "out of band" mechanism.

Figure 2:
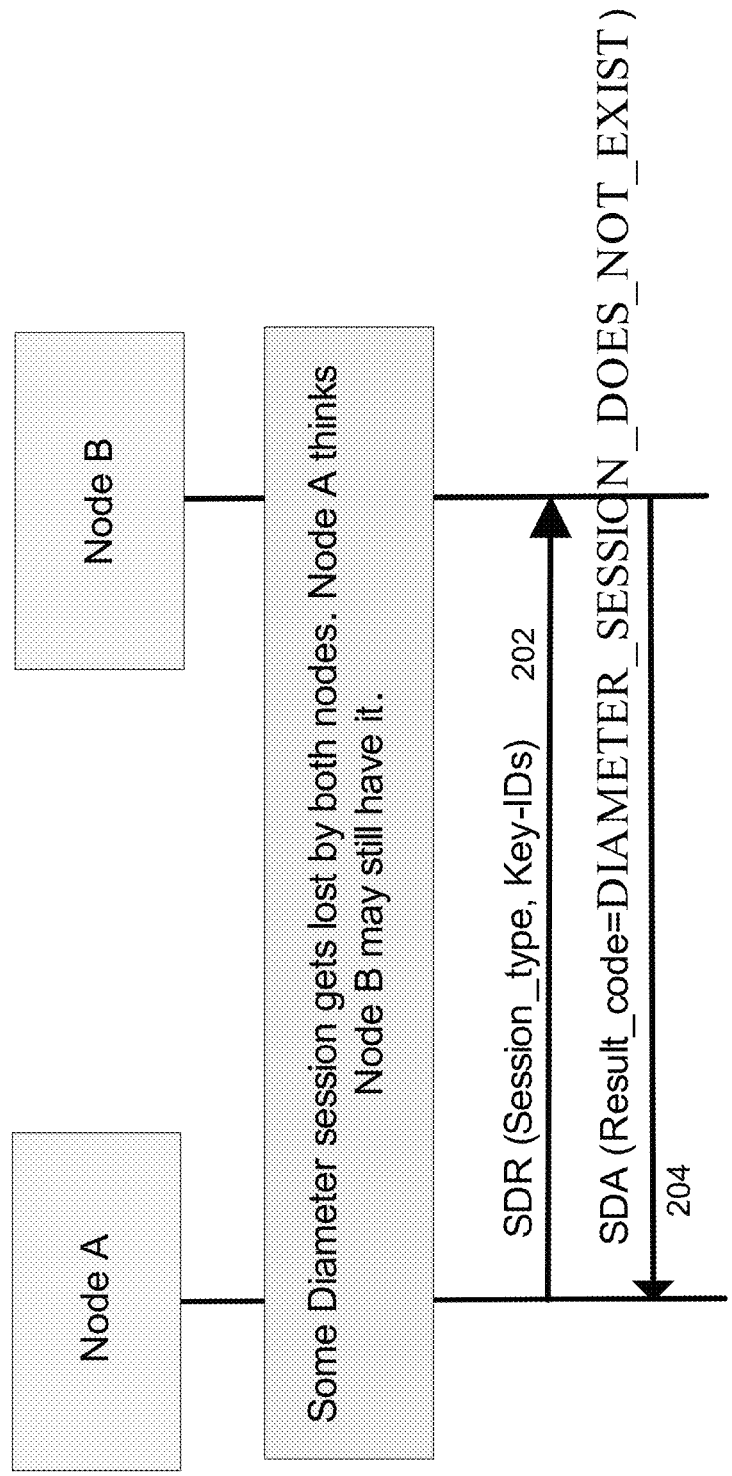
FIGS. 2 and 3 are call flow diagrams of the functionality of the Diameter based session discovery and recovery module of FIG. 1 when performing session discovery and recovery in accordance with embodiments of the present invention.
Figure 3:
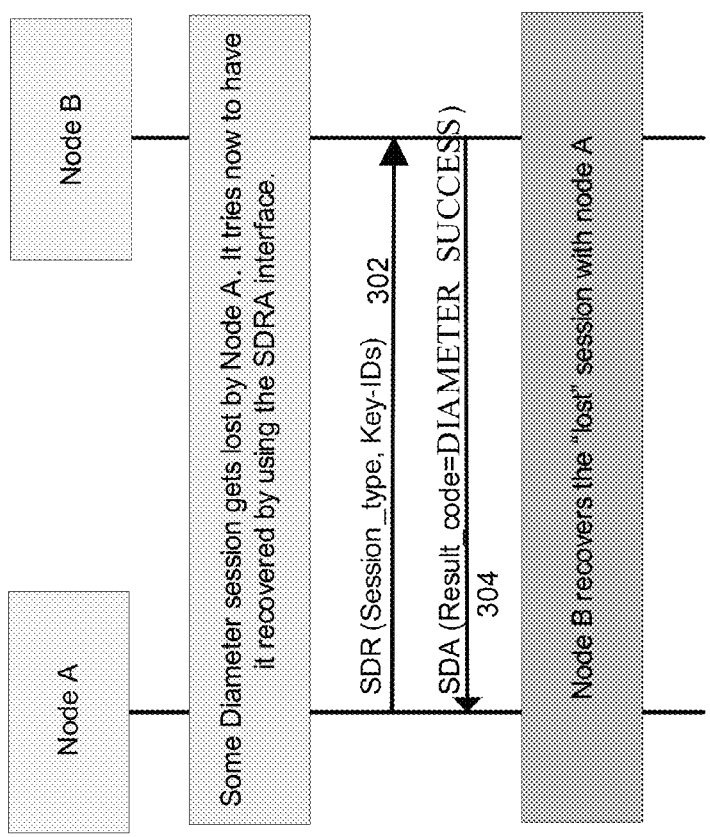

FIGS. 2 and 3 are call flow diagrams of the functionality of Diameter based session discovery and recovery module 16 of FIG. 1 when performing session discovery and recovery in accordance with embodiments of the present invention. In one embodiment, the functionality of the flow diagrams of FIGS. 2 and 3, and FIG. 4 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

In one embodiment, a Discovery based application implemented by Diameter based session discovery and recovery module 16, referred to as a "Session Discovery and Recovery Diameter application" ("SDRA"), is introduced between node A and node B. SDRA allows node A to query node B about a lost session and potentially request node B to re-establish the session. In one embodiment, node A is a PCRF and node B is a PCEF.

Embodiments denote key identifiers as the identifiers which include the minimal set of identifiers needed for discovery of a Diameter session by the queried node. For example, for a Gx and/or a Rx session, key identifiers can include the user's phone number or the International Mobile Subscriber Identity ("IMSI"), the user IP address, the Access Point Name ("APN") (i.e., the Called-Station-ID), and the Session-Type (e.g., Gx or Rx).

One embodiment supports one pair of request/answer commands: (1) a Session Discovery Request ("SDR") that allows node A to query node B for lost sessions associated with a session type and some key identifiers. It also allows node A to request node B to re-establish the session if it has one; and (2) a Session Discovery Answer ("SDA") that allows node B to inform node A whether it has found a session for the session type and potentially provide some key identifiers. In some embodiments, some nodes may have only one type of Diameter session running between them. For example, PCEF and PCRF would have only a Gx session type between them. In these embodiments, SDR may not include a session type as it is implicitly known.

The call flow diagram of FIG. 2 is applicable when the session no longer exists, and therefore cannot be reestablished. Node A formulates an SDR request. It then sends the Request to Node B at 202. The session does not exist. Therefore, at 204, node B returns an error—SESSION_DOES_NOT_EXIST.

The call flow diagram of FIG. 3 is applicable when the session exists and is discoverable. Node A formulates an SDR request. It then sends the Request to Node B at 302. The session exists. Therefore, at 304, node B returns a positive result—DIAMETER_SUCCESS. It will then recover the "lost" session.

Figure 4:
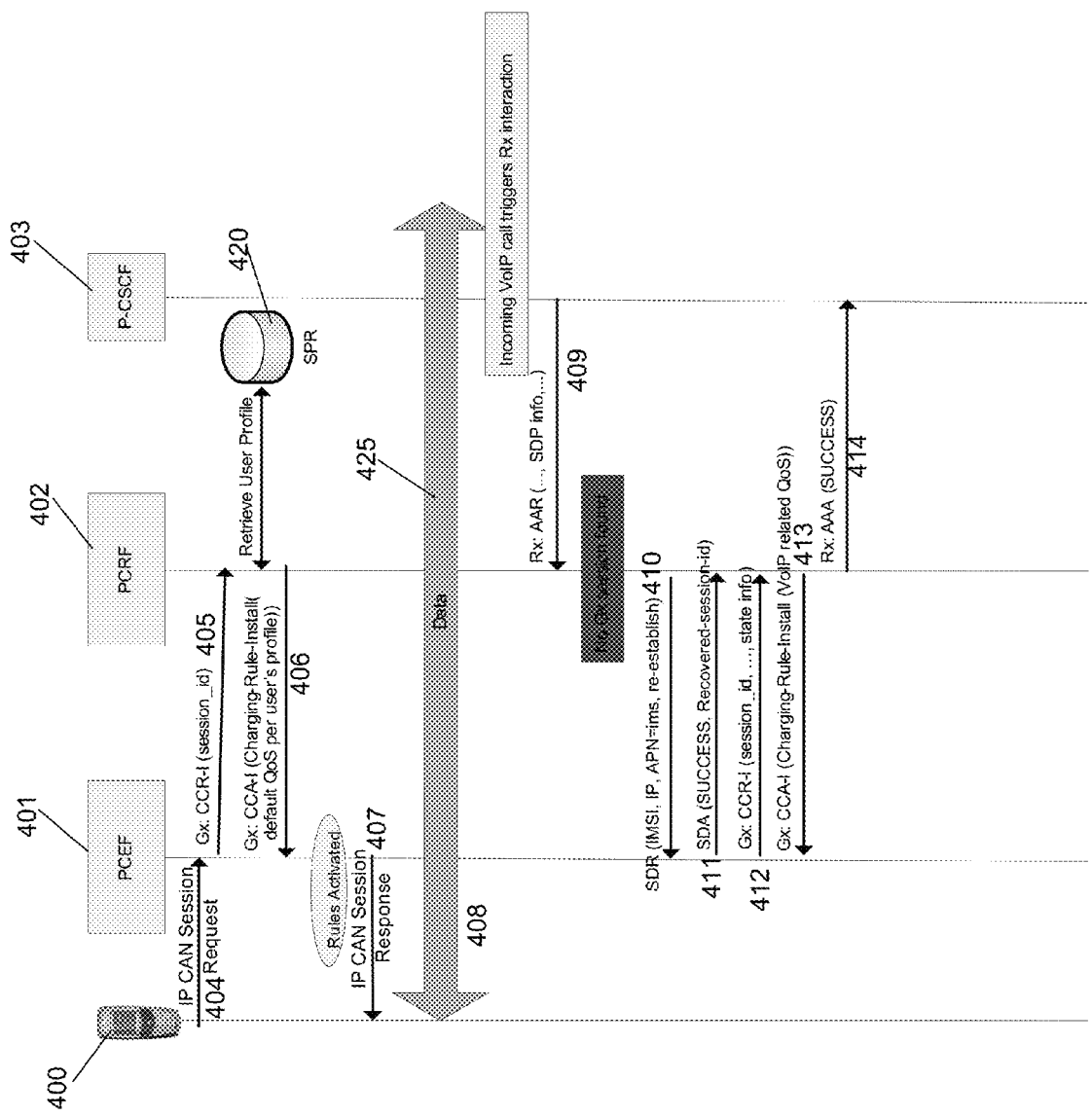
FIG. 4 is a call flow diagram of the functionality of the Diameter based session discovery and recovery module of FIG. 1 for Gx and Rx applications when performing session discovery and recovery in accordance with embodiments of the present invention.

FIG. 4 is a call flow diagram of the functionality of Diameter based session discovery and recovery module 16 of FIG. 1 for Gx and Rx applications when performing session discovery and recovery in accordance with embodiments of the present invention. The call flow of FIG. 4 is for a user in an LTE mobile network using a user equipment ("UE", e.g., a cell phone) attach. This procedure takes place after the user turns on an LTE mobile device 400. As a result, a Gx session between a PCEF 401 and a PCRF 402 is established.

At some point, PCRF 402 loses the Gx session state, and is not aware of it. After some time, there is an incoming Voice over LTE ("VoLTE") call for the user. As a result, an Rx session between an AF (P-CSCF) 403 and PCRF 402 is established. PCRF 402 first associates the Rx session with an existing Gx session for the subscriber and then performs authorization and installation of policy rules over Gx. However, in the example of FIG. 4, PCRF 402 cannot find the Gx session. It uses the SDRA functionality in accordance with embodiments of the invention to discover and recover the session as the Gx session should have existed in this case. Once the Gx session is recovered, the PCRF installs the Rx related rules over the recovered Gx session and authorizes the Rx request.

In connection with the call flow, at 404, an IP Connectivity Access Network ("IP-CAN") session establishment request is received for a user from mobile device 400. In response, at 405, PCEF 401 sends a Gx: Credit Control Request ("CCR-I") to PCRF 402.

At 406, PCRF 402 looks up the user profile in a Subscriber Profile Repository ("SPR 420") and responds with a Gx: Credit Control Answer ("CCA-I"). The Gx session is now established.

At 407, PCEF 401 responds to the access network with an IP-CAN session establishment response. At 408, rules are activated at PCEF 401 and user data can now be allowed over a user data path 425.

At 409, an incoming VoIP call triggers AF (P-CSCF) 403 to establish an Rx session with the PCRF (AAR-I) 402. However, at 410, PCRF 402 cannot find a respective Gx session for the user. It sends PCEF 402 an SDR request to discover and recover the lost Gx session.

At 411, PCEF 401 responds with success. Consequently, at 412 PCEF 401 re-establishes the lost Gx session. It will do so by sending a Gx CCR-Initial with session-ID, key parameters (e.g., Subscriber-ID) and state-information (e.g., rules, which were previously installed by the PCRF and their respective statuses) (412). The PCRF will acknowledge the Gx CCR-Initial (413) and will potentially update the reported rules or/and install new rules in order to satisfy the Rx request (409).

At 413, VoIP related rules are updated at PCEF 401. At 414, PCRF 402 responds with authorization success over Rx (Rx: AAA-Initial).

As described, the Session Discovery and Recovery Diameter application in accordance with one embodiment is introduced between the PCRF and PCEF to allow the PCRF to: (1) Query the PCEF about a subscriber's IP-CAN session; and (2) Request the PCEF to re-establish/recover the Gx session. Embodiments will support the following pair of request/answer commands:

1. Session Discovery Request ("SDR") will allow the PCRF to query the PCEF for Gx sessions associated with an International mobile Subscriber Identity ("IMSI") and/or IP address and APN. It will also allow the PCRF to request the PCEF to reestablish the Gx session if it has one.
2. Session Discovery Answer ("SDA") will allow the PCEF to inform the PCRF whether it has found corresponding sessions.
3. In subsequent in-band requests the PCEF will include the recovered sessions along with known subscriber identities associated with the sessions (i.e., IMSI, MSISDN, etc.)

In one embodiment, the Session Discovery Request's Augmented Backus-Naur Form ("ABNF") is as follows:

```
<SD-Request> ::= < Diameter Header: TBD, REQ, PXY >
< Session-Id >
{ Auth-Application-Id }
{ Origin-Host }
{ Origin-Realm }
{ Destination-Realm }
```

-continued

```
{ SD-Action} // Enumeration with the following values: QUERY(0),
QUERY_AND_RECOVER(1)
[ Destination-Host ]
*[ Subscription-Id ]
*[ Supported-Features ]
[ Framed-IP-Address ]
[ Framed-IPv6-Prefix ]
[ Called-Station-Id ]
[ Origin-State-Id ]
*[ Proxy-Info ]
*[ Route-Record ]
*[ AVP ]
```

In one embodiment, the Session Discovery Answer's ABNF is as follows:

```
<SD-Answer > ::= < Diameter Header: 265, PXY >
< Session-Id >
{ Auth-Application-Id }
{ Origin-Host }
{ Origin-Realm }
{ Auth-Session-State } // Set to NO_STATE_MAINTAINED
[ Result-Code ]
[ Experimental-Result ]
*[ Supported-Features ]
*[ Requested-Session-Id ] // Contains the discovered session-ids
if applicable
*[ Subscription-Id] //Includes user ids associated with the discovered
sessions
[ Error-Message ]
[ Error-Reporting-Host ]
*[ Failed-AVP ]
[ Origin-State-Id ]
*[ Redirect-Host ]
[ Redirect-Host-Usage ]
[ Redirect-Max-Cache-Time ]
*[ Proxy-Info ]
*[ AVP ]
This following error code will be returned by PCEF, when it doesn't find
the session info for the requested session in SDR -
DIAMETER_REQUESTED_SESSION_NOT_FOUND.
```

As disclosed, embodiments allow a Diameter based session to be recovered when lost. One node uses a separate session to send a request to the second node. The second node returns the information necessary to recover the initial session, or sends other information needed for auditing reasons, statistical reasons, etc.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to recover a first Diameter communication session between a first node and a second node, the recovery comprising:

in response to losing the first Diameter communication session, at the first node, generating a query using a second Diameter communication session that is a different session than the first Diameter communication session;

transmitting the query to the second node, wherein the query comprises a session type and key identifiers for the first Diameter communication session; and receiving from the second node in response to the query an indication that the first Diameter communication session exists, wherein the second node re-establishes the first Diameter communication session with the first node.

2. The computer-readable medium of claim 1, wherein the first Diameter communication session is a Gx session.

3. The computer-readable medium of claim 2, wherein the Gx session is established in response to a user turning on a mobile device.

4. The computer-readable medium of claim 1, wherein the first node is a Diameter server and the second node is a Diameter client.

5. The computer-readable medium of claim 4, wherein the first node is a Policy and Charging Rule Function (PCRF) and the second node is a Policy and Charging Enforcement Function (PCEF).

6. The computer-readable medium of claim 1, wherein the key identifiers comprise a phone number, an International Mobile Subscriber Identity, an Internet Protocol address, an Access Point Name or a Session-Type.

7. The computer-readable medium of claim 1, further receiving from the second node, in response to the query, audit information of the first Diameter communication session.

8. A method of operating a Diameter based network, the method comprising:
    establishing a first Diameter communication session between a first node and a second node;
    determining that the first Diameter communication session is lost;
    at the first node, generating a query using a second Diameter communication session that is a different session than the first Diameter communication session;
    transmitting the query from the first node to the second node, wherein the query comprises a session type and key identifiers for the first Diameter communication session;
    re-establishing by the second node the first Diameter communication session with the first node; and
    transmitting from the second node to the first node in response to the query an indication that the first Diameter communication session exists.

9. The method of claim 8, wherein the first Diameter communication session is a Gx session.

10. The method of claim 9, wherein the Gx session is established in response to a user turning on a mobile device.

11. The method of claim 8, wherein the first node is a Diameter server and the second node is a Diameter client.

12. The method of claim 11, wherein the first node is a Policy and Charging Rule Function (PCRF) and the second node is a Policy and Charging Enforcement Function (PCEF).

13. The method of claim 8, wherein the key identifiers comprise a phone number, an International Mobile Subscriber Identity, an Internet Protocol address, an Access Point Name or a Session-Type.

14. The method of claim 8, further comprising transmitting from the second node to the first node, in response to the query, audit information of the first Diameter communication session.

15. A Diameter server for a Diameter based network, the server comprising:
    a processor;
    a session recover module coupled to the processor that causes the processor to recover a first Diameter communication session between the Diameter server and a Diameter client, the recovery comprising:
    in response to losing the first Diameter communication session, generating a query using a second Diameter communication session that is a different session than the first Diameter communication session;
    transmitting the query to the Diameter client, wherein the query comprises a session type and key identifiers for the first Diameter communication session; and
    receiving from the Diameter client in response to the query an indication that the first Diameter communication session exists, wherein the Diameter client re-establishes the first Diameter communication session with the Diameter server.

16. The Diameter server of claim 15, wherein the first Diameter communication session is a Gx session.

17. The Diameter server of claim 16, wherein the Gx session is established in response to a user turning on a mobile device.

18. The Diameter server of claim 15, wherein Diameter server is a Policy and Charging Rule Function (PCRF) and the Diameter client is a Policy and Charging Enforcement Function (PCEF).

19. The Diameter server of claim 15, wherein the key identifiers comprise a phone number, an International Mobile Subscriber Identity, an Internet Protocol address, an Access Point Name or a Session-Type.

20. The Diameter server of claim 15, further receiving from the Diameter client, in response to the query, audit information of the first Diameter communication session.

* * * * *